Figure 1:
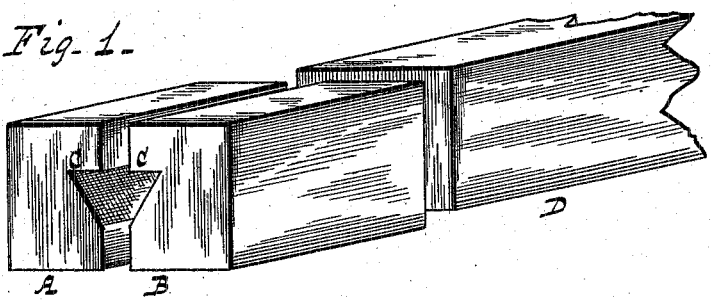

(No Model.)  2 Sheets—Sheet 1.

W. TAYLOR.
GRIPPING DIE.

No. 401,912. Patented Apr. 23, 1889.

(No Model.) 2 Sheets—Sheet 2.
W. TAYLOR
GRIPPING DIE.
No. 401,912. Patented Apr. 23, 1889.
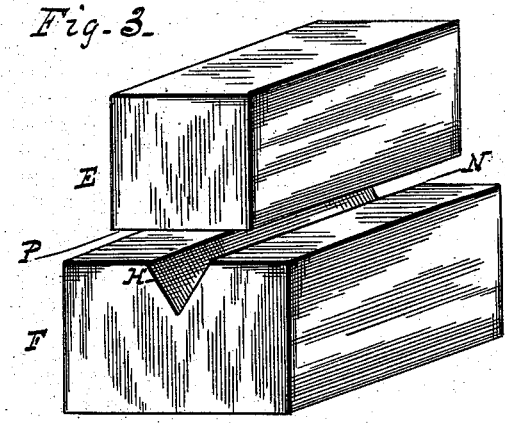
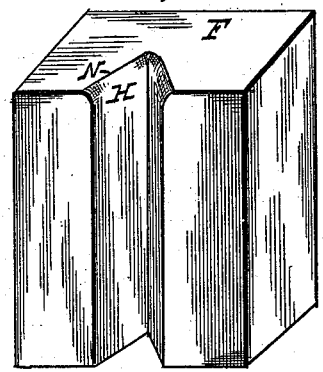
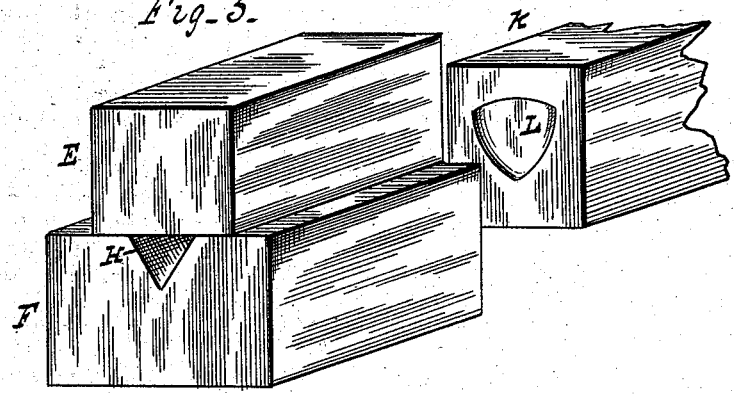
Witnesses:
Josiah W. Ells
Jas. Williams
Inventor:
William Taylor

UNITED STATES PATENT OFFICE.

WILLIAM TAYLOR, OF ALLEGHENY, PENNSYLVANIA.

GRIPPING-DIE.

SPECIFICATION forming part of Letters Patent No. 401,912, dated April 23, 1889.

Application filed April 19, 1888. Serial No. 271,247. (No model.)

*To all whom it may concern:*

Be it known that I, WILLIAM TAYLOR, a citizen of the United States, residing at Allegheny, in the county of Allegheny and State of Pennsylvania, have invented a new and useful Improvement in Dies, of which the following is a specification.

My invention relates to such dies as are used in wire-nail machines for seizing and holding the wire during the operation of staving a head thereon.

Heretofore the dies which have been used for gripping wire nails have been formed with cavities or apertures which are circular in cross-section. The manner of making them is as follows: Two or more (generally two) blocks of metal of suitable form are held together by being secured to a suitable carrier, and then a drill is applied at the center of the line of separation and a hole is bored, part of it constituting a cavity in one of the metal blocks and the other constituting a similar cavity or recess in the other block. This plan is tedious and expensive in that only one pair of dies can be formed at a time, it not being practicable to bore through more than that.

I have found that I can manufacture the dies at a greatly-reduced cost by forming in each of the opposing faces an angular cavity of such nature that when the two are brought together an aperture is presented which is triangular in cross-section. A number of suitable blocks of metal are clamped together face to face, and then are subjected to the action of a milling tool or cutter of the character of a gear-cutter. This can be rapidly carried across the faces of the whole series of blocks and at one traverse can produce the cavities or partial apertures through the whole series. By this method I greatly cheapen the manufacture of the dies and finish them up rapidly.

It is well known to those acquainted with the art to which this invention relates that in wire-nail machines the parts which most rapidly become impaired are the gripping-dies and the cutting-tools, and that they have to be frequently withdrawn and replaced with new ones. As made heretofore the cost incident to their manufacture has been a drawback. Moreover, I have found that it is not practicable to drill or bore circular apertures as true as is desirable, owing to the well-known fact that the drill, passing between two separable plates of metal, tends to swerve to one side or the other, especially when the drills are small; but when grooves are formed by means of a milling-tool acting along flat surfaces the cavities are all similar, and any two of them can be made to exactly correspond to each other when placed oppositely. In another respect the dies heretofore in use, having circular apertures formed by drilling through them, have been disadvantageous in that it is difficult to form therein and keep in good order the burring or serrating projections which are generally formed in wire-nail dies for the purpose of producing notches or nicks on the surfaces of the nails to insure a better hold in the wood. With the circular dies such burring or serrating projections can be formed and kept in order only along the edges of the cavities, as it is not practicable to get a file or other available tool into the bottom innermost curved part of the cavity. I find that by making the cavity triangular in cross-section I can readily provide such burring projections over each and all of the faces of the walls bounding the cavities, as said faces are flat, and each and all extend to the face of the die, so that access can readily be had to any part of said interior faces and on such lines as to reach the whole of the interior by a file or other simple and ordinary tool.

I have not herein illustrated the nicks, notches, or indentations in the dies, and such illustration is unnecessary, as they are well known to those acquainted with the art to which this case relates, they having been heretofore used both for producing the serrations or notches in the nail for grasping the wood and also for temporarily increasing the gripping action of the dies while the heading device is exerting its force against the end of the wire. I do not mean by the above remarks that dies of this sort are not adapted to be used in combination with a separate wire-serrating mechanism—such as serrated wheels or rolls, well known in the art—as they (the dies) are so adapted, although even in the latter case (that is, when use is made of separate and preliminary serrating devices) it is well to have the dies also roughened or nicked to effect the grip above referred to.

Heretofore, the apertures being bored or drilled and round in cross-section, it has been necessary to employ a correspondingly-shaped wire—that is to say, one circular in form—as it would not be possible to pass between and grip by the circular dies a wire which is non-circular in form without crushing the corners.

Figure 2:
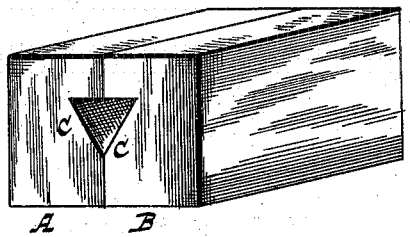

Figure 1 is a perspective view of a pair of gripping-dies embodying my invention, it showing, also, a part of a heading-ram, the dies being shown separated. Fig. 2 shows the gripping-dies when brought together. Fig. 3 shows a modified form of the dies. Fig. 4 is a perspective of the lower die in Fig. 3. Fig. 5 shows the parts illustrated in Fig. 3, together with a heading-ram.

The two dies are respectively represented by A and B. They are formed of steel or other suitable material, and in most respects of any suitable conformation. On their opposing faces they are provided with angular grooves or recesses c c, such that when the dies are brought together the two grooves shall present an aperture which is triangular in section. The aperture so provided is unlike those in any earlier dies with which I am acquainted, in that it not only extends from one side of the die to the other, but also at all points gives a triangle in section, all of which triangles are of substantially equal area. This cavity should be smaller than the wire which is to be gripped thereby, so that when the dies are closed they will grasp and hold it sufficiently tight to enable the ram D to stave a head.

For large nails or spikes I prefer to modify the dies somewhat and form the cavity in one block of metal entirely, as shown in Figs. 3, 4, and 5. The other die may then be plain-faced. The groove or cavity in this case has two walls situated at an angle to the face different from the angles of the face in Figs. 1 and 2, this becoming necessary because of forming the whole of the cavity in one block. In either case the grooves in a large number of the blocks of metal can be formed at one and the same operation, it being merely necessary to clamp them together and then cause a milling-tool to traverse their faces, so that the grooves can be rapidly cut. Afterward, if the dies are cut as in Figs. 1 and 2, any two of them, after being so treated, can be placed oppositely to each other as companions. If, on the other hand, the series of blocks are cut in the way indicated in Figs. 3, 4, and 5, one only is necessary, the other being a more simply-formed block, as at B. Again, in either case it will be seen that the flat faces which form the bounding walls of the triangular aperture are all accessible, each running to some exposed surface. As a consequence, nicks or notches transverse to the length of the grooves can be readily formed and can be kept in order by ordinary tools without difficulty.

These dies are, one or both, secured to reciprocating devices in such way as to approach and recede from the path of the wire and intermittingly grip the same. With them are combined the heading-ram shown at K, it being of any suitable form, and having either a flat operative end or a recessed end, as shown at L; and to produce a shoulder underneath the nail-head the end of the groove or grooves in the dies opposite the ram K may have the corners rounded or deprived of the sharp edges, as shown in Fig. 4. After overcoming the difficulties incident to the manufacture and use of the dies with round apertures by constructing them with triangular apertures, as herein shown and described, I have found that they can be advantageously used in the gripping of wire which is also triangular in section; but their use need not be limited thereto, as they are also adapted to grasp wires of other forms.

For ordinary purposes in constructing small nails I prefer the arrangement of the grooves shown in Figs. 1 and 2—that is to say, such an arrangement of them as to have the plane of contact of the opposing faces of the dies intersect one of the sides of the triangular aperture and coincide with the line of intersection of the other two sides—as the two grooves can be made quite shallow, and their depth can be nicely adjusted to the thickness of the fine wires which I employ.

What I claim is—

1. In a wire-nail machine, a pair of gripping-dies constructed to have or present by the junction of said dies a receiving-cavity all of whose transverse sections are substantially equal triangles, and the faces of which triangular cavity extend to and intersect exposed faces of the dies, whereby the said faces of the cavity are accessible, substantially as set forth.

2. In a wire-nail machine, a pair of gripping-dies constructed to have or present by the junction of said dies a wire-receiving cavity all of whose transverse sections are substantially equal triangles, said cavity having three substantially equal faces or walls, and the two dies being separable on a plane which coincides with the line of intersection of two of the said faces or walls, substantially as set forth.

WILLIAM TAYLOR.

Witnesses:
JOSIAH W. ELLS,
JAS. C. WILLIAMS.